RAYMOND A. BARKHUFF JR.
NORBERT PLATZER.
INVENTORS

April 4, 1961 R. A. BARKHUFF, JR., ET AL 2,977,639
METHOD FOR PREPARING LAMINATED PLASTIC STRUCTURES
Filed Oct. 20, 1955 2 Sheets-Sheet 2

RAYMOND A. BARKHUFF JR.
NORBERT PLATZER.
INVENTORS.

BY *R. L. Kelly*
ATTORNEY.

United States Patent Office 2,977,639
Patented Apr. 4, 1961

2,977,639

METHOD FOR PREPARING LAMINATED PLASTIC STRUCTURES

Raymond A. Barkhuff, Jr., East Longmeadow, and Norbert Platzer, Springfield, Mass., assignors to Monsanto Chemical Company, St. Louis, Mo., a corporation of Delaware Filed Oct. 20, 1955, Ser. No. 541,557

6 Claims. (Cl. 18—59)

This invention relates to a method of manufacturing laminated plastic structures and particularly to structures in which formed thermoplastic sheets are laminated to at least one surface of a resin foam.

In the manufacture of numerous articles it would be desirable to have formed thermoplastic sheets laminated to one or a plurality of surfaces of a resin foam. For example, such laminated structures would be useful in the manufacture of refrigerator panels, light-weight shipping containers, life belts, novelties, etc. Heretofore, to manufacture such laminated structures it has been necessary (1) to form a thermoplastic sheet, (2) to foam the foamable resin in a mold conforming to the contours of the formed thermoplastic sheet and (3) to cement the formed thermoplastic sheet and resin foam together with an adhesive. Such processes are unwieldy and on a practical basis can be employed only where the contours of the formed thermoplastic sheet are relatively simple. In addition, when the formed thermoplastic sheet is prepared by vacuum drawing (a conventional method), the laminated structure has a mat surface, whereas a glossy surface is desired in many applications.

Consequently, it is an object of this invention to provide an improved process for preparing a resin foam having formed thermoplastic sheets laminated thereto.

Another object of this invention is to provide a one-step process for foaming a resin and laminating a thermoplastic sheet thereto.

A further object of this invention is to prepare resin foams having formed thermoplastic sheets laminated thereto and which are characterized in that the formed thermoplastic sheets have glossy surfaces.

Figure 1:
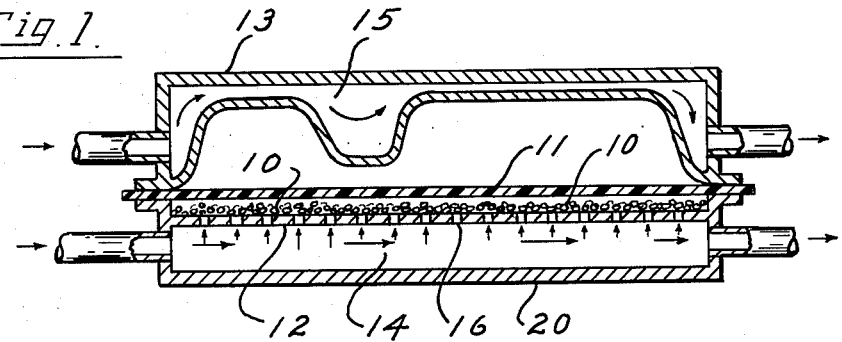
Figure 2:
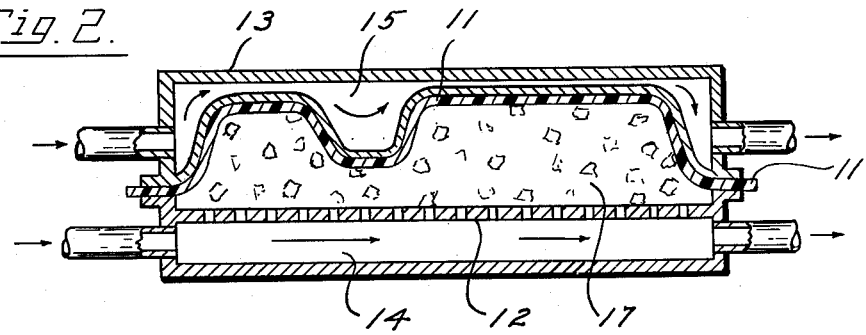
Figure 3:
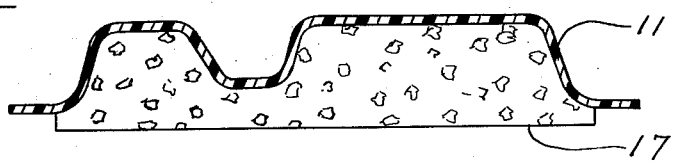
Figure 4:
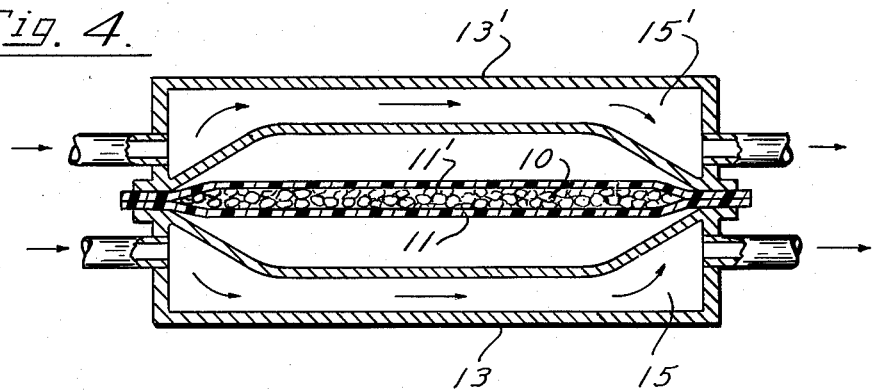
Figure 5:
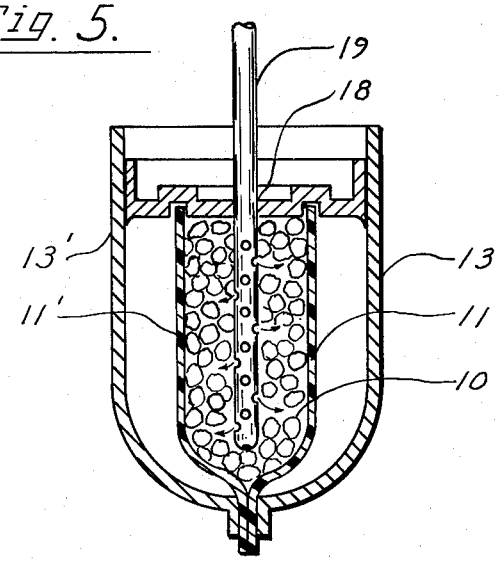

Other objects and advantages of this invention will become apparent from the following detailed description thereof when read in conjunction with the attached drawings in which Fig. 1 is a cross-sectional view of an operative mold assembly showing the position of the thermoplastic sheet and foamable resin before foaming the foamable resin, Fig. 2 is a cross-sectional view of the same mold assembly after the foamable resin has been foamed, Fig. 3 is a cross-sectional view of the laminate of resin foam and formed thermoplastic sheet removed from the mold assembly, and Figs. 4 and 5 are cross-sectional views of other mold assemblies that may be employed in the practice of this invention.

A one-step process has been discovered for preparing a resin foam having formed thermoplastic sheets laminated to at least one surface thereof. In this process a sheet of thermoplastic resin is placed over a contoured mold half, a covering mold half is placed over the thermoplastic sheet, a foamable resin is placed in the cavity defined by the thermoplastic sheet and the covering mold half and heat is applied to soften the thermoplastic sheet and foam the foamable resin thereby forcing the thermoplastic sheet into pressured contact with the contour faces of the contoured mold half.

In Fig. 1, beads of foamable thermoplastic resin 10, e.g. polystyrene containing 1–10% pentane, are placed on a perforated face 12 of mold plate 20. A sheet of thermoplastic resin 11, e.g. high impact polystyrene, is clamped between mold plate 20 and contoured mold half 13. Mold plate 20 is provided with a jacket 14 through which steam is passed to foam the foamable resin. Steam from jacket 14 passes through holes 16 provided in the face of mold plate 20 and physically contacts the foamable thermoplastic resin beads 10 and thermoplastic sheet 11. Steam is also passed through jacket 15 of contoured mold half 13.

As illustrated in Fig. 2, after the steam is applied, the thermoplastic sheet 11 is softened and foamable thermoplastic beads 10 foam to form a voluminous resin mass 17. The pressure of the foaming resin forces the softened thermoplastic sheet 11 into pressured contact with the contour faces of contoured mold half 13 and forms an adherent bond between thermoplastic sheet 11 and resin foam 17. Fig. 3 shows the laminate of resin foam 17 and formed thermoplastic sheet 11 removed from the mold assembly.

To prepare a laminate in which all surfaces of the resin foam are covered with a formed thermoplastic sheet, the mold assembly of Fig. 4 may be employed. The beads of foamable resin 10 are placed between two thermoplastic sheets 11 and 11' which are clamped between two contoured mold halves 13 and 13'. In this embodiment of the invention, heat to foam the foamable resin is applied indirectly by passing steam through jackets 15 and 15' of contoured mold halves 13 and 13'.

Fig. 5 illustrates an embodiment of the invention in which all surfaces of the resin foam are covered with a formed thermoplastic sheet and in which foaming of the foamable resin beads 10 is effected by contact with steam. Partially foamed resin beads 10, e.g. polystyrene containing 1–10% pentane, are placed between two thermoplastic sheets 11 and 11' which are clamped between two contoured mold halves 13 and 13'. The assembly of mold halves 13 and 13' is completely closed except for a small circular opening 18 through which a steam probe 19 is inserted. Steam from probe 19 softens thermoplastic sheets 11 and 11' and foams resin beads 10 into a voluminous plastic mass which forces thermoplastic sheets 11 and 11' into pressured contact with the contour faces of mold halves 13 and 13' as previously described. When probe 19 is removed from circular opening 18, the residual heat in the resin foam further foams the resin contiguous to the opening to completely fill the void.

In addition to ease of fabrication, there are two additional major advantages associated with the laminated structures prepared by the method of this invention. The first advantage is that the laminates can be prepared so that the formed thermoplastic sheets have a glossy surface in contradistinction to the mat finish obtained by prior art processes. To obtain a glossy surface in the finished laminate, the contour surface of the contoured mold must be heated above the second order transition temperature of the thermoplastic sheet employed. In the case where a polystyrene sheet is employed, the contour mold surfaces must be heated to a temperature of the order of 120–130° C. The second advantage of the structures is that they are stronger and more rigid than corresponding unlaminated formed thermoplastic sheets. For example, a formed 0.020" polystyrene sheet that is laminated to a layer of foamed polystyrene by the method of this invention is equivalent in rigidity to a corresponding unlaminated 0.080" polystyrene sheet and is at the same time lighter in weight. The importance of this phenomenon is that light gauge thermoplastic sheets can be formed into complex forms and simultaneously laminated to a resin foam to provide rigid, yet light weight, merchandising packages, display cases, etc.

The present invention is particularly adapted to the manufacture of refrigerator panels, especially refrigerator door panels. Refrigerator doors customarily are prepared by forming an interior door panel by vacuum drawing a thermoplastic sheet, attaching the vacuum drawn thermoplastic sheet to the outer door panel and filling the cavity between the inner and outer panels with glass wool. This manufacturing process is time consuming and costly in that considerable hand labor is involved. By the process of the present invention, however, an interior door panel and a resin foam insulating layer conforming to the geometry of the outer door panel can be prepared in one step. The door then can be fabricated by simply fastening the formed thermoplastic sheet-resin foam laminate to the outer door panel.

Any thermoplastic sheet that can be fabricated by vacuum drawing techniques can be employed in the process of the present invention. Examples of such sheets include those prepared from cellulose ethers, e.g., methyl cellulose, ethyl cellulose; cellulose esters, e.g., cellulose nitrate, cellulose acetate, cellulose butyrate, cellulose acetate-butyrate; homopolymers and interpolymers derived from monomers containing the vinylidene group $CH_2=C<$ such as vinyl halides, e.g., vinyl chloride, vinyl bromide; vinylidene chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, acrylic acid esters, acrylamide, acrylonitrile, methacrylic acid esters, methacrylonitrile; vinyl aromatic compounds, e.g., styrene, vinyl toluene, alpha-methylstyrene, o-chlorostyrene, 2,5-dichlorostyrene, 2,4-dimethylstyrene; and interpolymers of vinylidene monomers with alpha,beta-unsaturated polycarboxylic acids and derivatives thereof, e.g., maleic anhydride, diethyl maleate, dibutyl fumarate, diallyl maleate; etc. The thermoplastic sheets also may be fabricated from blends of two or more polymeric materials, e.g., blends of polyvinyl chloride and butadiene-acrylonitrile interpolymers, blends of polystyrene with rubbery diene polymers such as natural rubber, butadiene-styrene interpolymers, butadiene-acrylonitrile interpolymers, etc., or from high impact polystyrene prepared by polymerizing monomeric styrene in the presence of rubbery diene polymers. It is generally preferred to prepare the laminated structures from thermoplastic sheets which are hard and rigid at room temperature. Prime examples of such sheets include sheets of polyvinyl chloride and sheets of polystyrene or high impact polystyrene.

Essentially any foamable thermosetting or thermoplastic resin composition can be employed in the practice of this invention. Such foamable resin compositions consist of a predominant proportion of resin and a smaller proportion of a blowing or foaming agent. The blowing or foaming agent employed may be any one of a large number of diverse types well known in the art and the selection of the particular foaming agent will be governed largely by the particular resin in which it is to be incorporated.

Examples of the resins that may be employed include the phenol-aldehyde types, the urea-aldehyde types, the melamine-aldehyde types, cellulose ethers and esters, e.g., methyl cellulose, cellulose acetate, homopolymers and interpolymers derived from monomers containing the vinylidene group $CH_2=C<$ such as vinyl halides, e.g., vinyl chloride; vinylidene chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, acrylic acid esters, acrylamide, acrylonitrile, methacrylic acid, ethacrylic acid esters; vinyl aromatic compounds, e.g., styrene, vinyl toluene, alpha-methylstyrene, o-chlorostyrene, 2,5-dichlorostyrene, 2,4-dimethylstyrene; and interpolymers of vinylidene monomers with alpha,beta-unsaturated polycarboxylic acid and derivatives thereof, e.g., maleic anhydride, diethyl maleate, dibutyl fumarate, diallyl maleate; etc.

The preferred foamable resin composition for use in the practice of the present invention comprise polystyrene having incorporated therein as a foaming agent a volatile, non-reactive organic liquid which has little or no solvent action on the poylstyrene, e.g., pentane.

Pigments, coloring materials, antioxidants, lubricants, stabilizers, etc., may be incorporated in both the thermoplastic resin sheets and the foamable resin compositions.

When the formed thermoplastic sheet and the resin foam employed are chemically similar, e.g. when a polystyrene sheet is employed with a polystyrene foam, strong adherent bonds are obtained between the formed thermoplastic sheet and the resin foam without the use of adhesives. Where, however, the thermoplastic sheet and the resin foam employed are chemically dissimilar, it may be necessary to use adhesives to obtain good adhesion. No difficulty is encountered in finding suitable adhesives and the selection of the particular adhesives to be employed will be governed by the chemical nature of the formed thermoplastic sheet and the resin foam employed.

The above descriptions and particularly the examples are set forth by way of illustration only. It will be obvious to those skilled in the art that many variations and modifications thereof can be made without departing from the spirit and scope of the invention herein described.

What is claimed is:

1. A method for preparing a manufactured article consisting of a styrene polymer foam having a formed thermoplastic resin sheet laminated to at least one surface thereof which comprises (1) interposing a flat, rigid, self-supporting, normally nonelastic, thermoplastic resin sheet between the flat opposed faces of two mold halves, at least one of which has a contoured mold surface, so as to intersect the entire peripheral edge of the mold cavity defined by said two mold halves, (2) placing in the mold cavity, and on the side of the thermoplastic resin sheet that is removed from said contoured mold surface, a quantity of a particulate foamable styrene polymer composition that is sufficient, when foamed, to fill the mold cavity, (3) heating the contoured mold half above the second order transition temperature of the thermoplastic sheet and (4) heating the thermoplastic resin sheet and the particulate foamable styrene polymer composition to soften the thermoplastic resin sheet and to foam the particulate foamable styrene polymer composition thereby forcing the softened thermoplastic resin sheet into pressured contact with the entire heated contoured mold surface; said foamable styrene polymer composition comprising a styrene polymer and a volatile, non-reactive organic liquid which has, at most, a slight solvent action on the styrene polymer.

2. A method for preparing a manufactured article consisting of a styrene polymer foam having two formed thermoplastic resin sheets laminated thereto which comprises (1) interposing a sandwich structure between the flat opposed faces of two mold halves both of which have contoured mold surfaces, so as to intersect the entire peripheral edge of the mold cavity defined by said two mold halves, said sandwich structure consisting of two flat, rigid, self-supporting, normally nonelastic thermoplastic resin sheets having placed therebetween a quantity of a particulate foamable styrene polymer composition that is sufficient, when foamed, to fill the mold cavity, (2) heating the contoured mold surfaces above the second order transition temperature of the thermoplastic resin sheets employed in the sandwich structure and (3) heating said sandwich structure to soften the thermoplastic resin sheets and to foam the particulate foamable styrene polymer composition thereby forcing the thermoplastic resin sheets into pressured contact with the entire heated contoured mold surfaces; said foamable styrene polymer composition comprising a styrene polymer and a volatile, non-reactive organic liquid which has, at most, a slight solvent action on the styrene polymer.

3. The method of claim 1 wherein the thermoplastic resin sheet and the particulate foamable styrene polymer composition are heated by admitting steam into the mold cavity.

4. The method of claim 3 in which the thermoplastic resin sheet employed is a polystyrene sheet and the contour surface of the contoured mold half is heated to a temperature of at least 120–130° C.

5. The method of claim 2 wherein the thermoplastic resin sheets and the particulate foamable styrene polymer composition are heated by admitting steam into the mold cavity.

6. The method of claim 5 in which the thermoplastic resin sheets employed are polystyrene sheets and the contour surfaces of the contoured mold halves are heated to a temperature of at least 120–130° C.

References Cited in the file of this patent

UNITED STATES PATENTS

| | | |
|---|---|---|
| 1,610,286 | Hood et al. | Dec. 14, 1926 |
| 1,645,604 | Lower | Oct. 18, 1927 |
| 2,247,337 | Raflovich | June 24, 1941 |
| 2,319,042 | De Wyk | May 11, 1943 |
| 2,551,005 | Johnson | May 1, 1951 |
| 2,705,211 | De Wyk | Mar. 29, 1955 |
| 2,744,291 | Stastny et al. | May 8, 1956 |
| 2,753,642 | Sullivan | July 10, 1956 |
| 2,802,766 | Leverenz | Aug. 13, 1957 |

OTHER REFERENCES

Kopper's booklet, "Dylite-Expandable-Polystyrene," 1954, pp. 11 and 21.